(12) United States Patent
De Bie

(10) Patent No.: US 8,668,256 B2
(45) Date of Patent: Mar. 11, 2014

(54) ROOF PANEL AND METHOD OF MANUFACTURING SAID PANEL

(75) Inventor: Sander De Bie, Nuth (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/575,215

(22) PCT Filed: Jan. 26, 2011

(86) PCT No.: PCT/EP2011/051073
§ 371 (c)(1),
(2), (4) Date: Jul. 25, 2012

(87) PCT Pub. No.: WO2011/092207
PCT Pub. Date: Aug. 4, 2011

(65) Prior Publication Data
US 2012/0292951 A1  Nov. 22, 2012

(30) Foreign Application Priority Data
Jan. 27, 2010 (EP) .................................... 10151831

(51) Int. Cl.
*B60J 7/00* (2006.01)
(52) U.S. Cl.
USPC .................................................. 296/216.09
(58) Field of Classification Search
USPC ...................................... 296/216.09, 187.02
See application file for complete search history.

(56) References Cited

U.S. PATENT DOCUMENTS

| | | |
|---|---|---|
| 4,378,394 A | 3/1983 | Miura et al. |
| 4,378,395 A | 3/1983 | Asoshina et al. |
| 4,451,518 A | 5/1984 | Miura et al. |
| 4,738,482 A | 4/1988 | Bohm et al. |
| 4,822,098 A | 4/1989 | Vogt et al. |
| 4,826,239 A | 5/1989 | Nishikawa |
| 4,830,908 A | 5/1989 | Nakajima et al. |
| 4,881,773 A | 11/1989 | Ichinose |
| 4,936,064 A | 6/1990 | Gibb |
| 4,945,682 A | 8/1990 | Altman et al. |
| 5,024,399 A | 6/1991 | Barquet et al. |

(Continued)

FOREIGN PATENT DOCUMENTS

| | | |
|---|---|---|
| DE | 29704030 | 5/1997 |
| DE | 202004020443 | 7/2005 |
| EP | 1495891 | 1/2005 |
| FR | 2814705 | 4/2002 |

OTHER PUBLICATIONS

Official Search Report and Written Opinion of the European Patent Office in counterpart foreign application No. PCT/EP2011/051073 filed Jan. 26, 2011.

*Primary Examiner* — Dennis Pedder
(74) *Attorney, Agent, or Firm* — Steven M. Koehler; Westman, Champlin & Koehler, P.A.

(57) ABSTRACT

The application discloses a panel assembly for use in a open roof construction for a vehicle. The panel assembly comprises a panel main body, and at least one reinforcement member positioned in the vicinity of at least a part of the edges of said panel main body, and firmly connected thereto by means of a part molded in a molding process to said panel main body and said reinforcement member. A provision is made for locally at least reducing adherence of the moldable material to said reinforcement member and/or said panel main body during molding. There is also disclosed a method of manufacturing the panel assembly.

19 Claims, 4 Drawing Sheets

(56) References Cited

U.S. PATENT DOCUMENTS

| | | |
|---|---|---|
| 5,050,928 A | 9/1991 | Bohm et al. |
| 5,069,737 A | 12/1991 | Guiton |
| 5,170,587 A | 12/1992 | Nakatani et al. |
| 5,195,440 A | 3/1993 | Gottlieb |
| 5,501,052 A | 3/1996 | Saji |
| 5,682,667 A | 11/1997 | Flagg |
| 5,727,840 A | 3/1998 | Ochiai et al. |
| 5,779,301 A | 7/1998 | Ito |
| 5,865,496 A | 2/1999 | Odan et al. |
| 6,079,771 A | 6/2000 | Brandner et al. |
| 6,273,500 B1 | 8/2001 | Boersma et al. |
| 6,283,542 B1 | 9/2001 | Pangtz |
| 6,328,359 B1 | 12/2001 | Pacella et al. |
| 6,540,289 B2 | 4/2003 | Bergmiller et al. |
| 6,669,278 B2 | 12/2003 | Patelczyk et al. |
| 6,893,084 B2 | 5/2005 | Tamura et al. |
| 7,063,378 B2 * | 6/2006 | Bott et al. ............... 296/216.09 |
| 7,628,448 B2 | 12/2009 | Katayama et al. |
| 7,641,274 B2 * | 1/2010 | Boehm et al. ............ 296/216.09 |
| 7,658,441 B2 | 2/2010 | Rich et al. |
| 7,744,146 B2 | 6/2010 | Lee |
| 8,182,025 B2 | 5/2012 | Auchter-Bruening |
| 2003/0183965 A1 | 10/2003 | Bergmiller |
| 2004/0160090 A1 | 8/2004 | Teschner |

\* cited by examiner

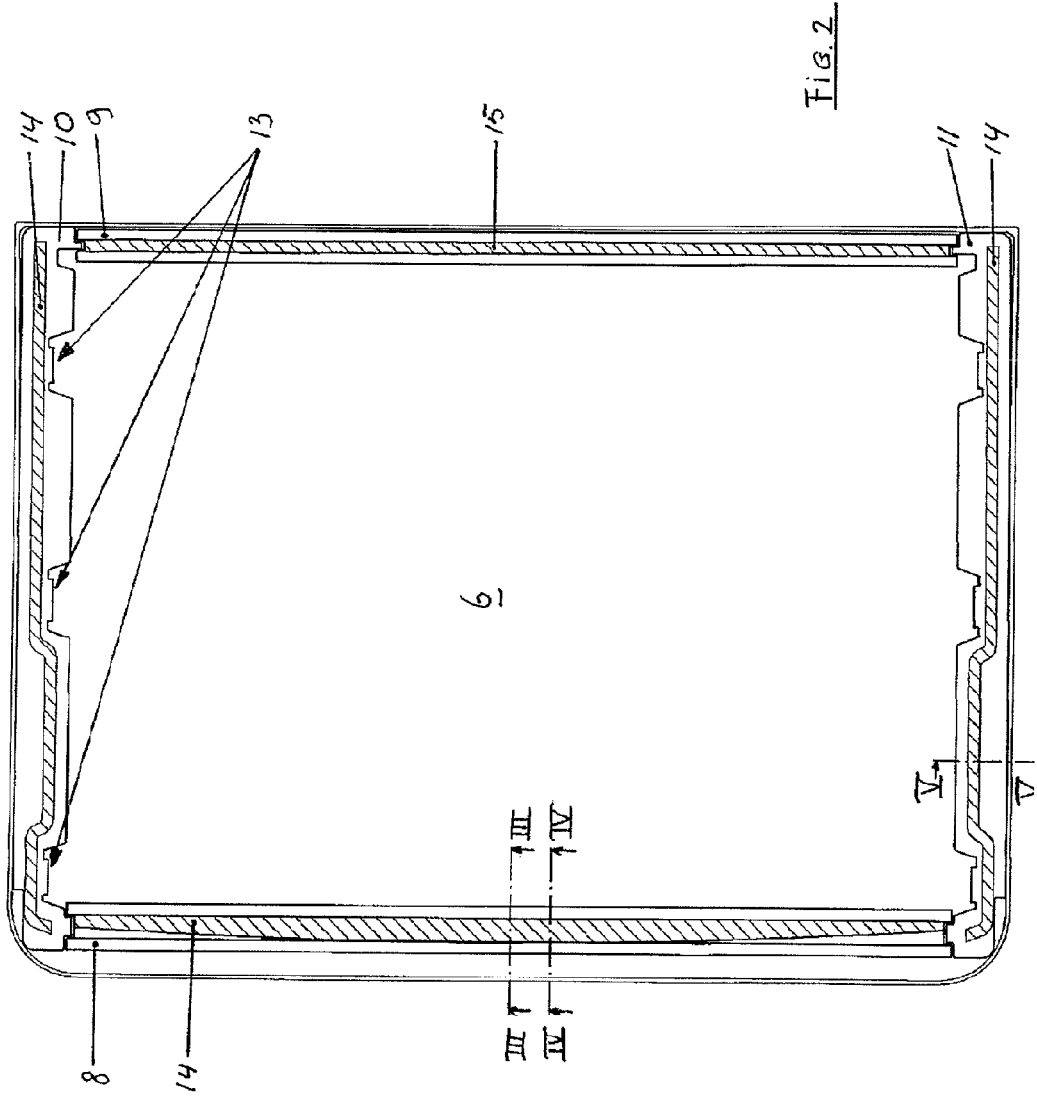

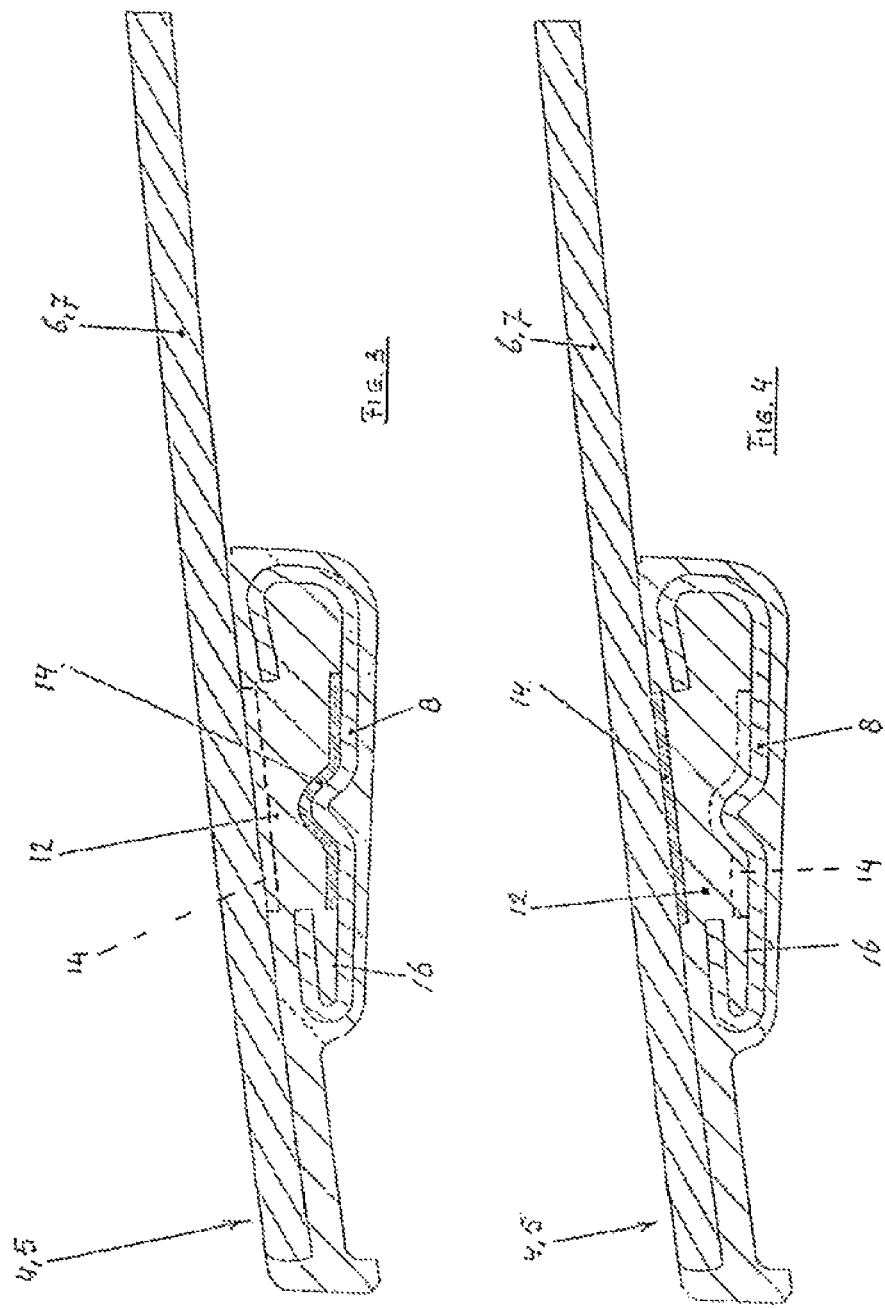

ROOF PANEL AND METHOD OF MANUFACTURING SAID PANEL

CROSS-REFERENCE TO RELATED APPLICATION

This application is a Section 371 National Stage Application of International Application PCT/EP2011/051073 filed Jan. 26, 2011 and published as WO/2011/092207A1 in English.

BACKGROUND

The discussion below is merely provided for general background information and is not intended to be used as an aid in determining the scope of the claimed subject matter.

Aspects of the invention concern a panel for use in an open roof construction for a vehicle, comprising a substantially rectangular panel main body, and at least one reinforcement member positioned in the vicinity of at least a part of the edges of said panel main body, and firmly connected thereto.

At present, the reinforcement members are connected to the panels by means of a plastic part, molded in a molding process. The connection by the plastic part between the reinforcement member and the panel is very firm. During and just after the molding process, the material of the plastic part will shrink. The amount of shrinkage depends on the local volume concentration of plastic material, whereby a large volume of material will cause a high rate of shrinkage at the extremities of such large volume of material. This shrinkage will have a negative influence on the geometry of the panel after molding. This influence may result in that panels are rejected after the molding process, due to lack of geometrical quality, or that panels will be damaged during use in the vehicle, because of too high internal material stresses.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention, a panel of the type referred to above includes a provision for locally at least reducing adherence of plastic material to the reinforcement member and/or the panel main body during molding.

As a result during and just after the molding process the shrinkage problems will be reduced because not all shrinkage forces will be transferred to the panel and/or reinforcement member due to the locally reduced adherence.

In one embodiment, said provision is provided next to a surface of only one of the panel and the reinforcement member, and the provision is surrounded substantially completely by the plastic material except where it is applied to said surface of the panel or the reinforcement member.

This embodiment improves the quality (e.g. long term) of the connection between the plastic part and the panel main body or reinforcement member. If the panel is not positioned at the edge of the plastic material there is no risk of bending forces in the panel main body acting upon the area weakened by the provision. Because the provision is completely surrounded by the plastic material it is also protected from the weather influence which may deteriorate the provision or otherwise affect the adherence of the plastic material to the panel main body or reinforcement member.

In one embodiment of the panel the provision for locally at least reducing adherence of the plastic material to the reinforcement member and/or the panel main body is a plastic film coated with an adhesive on one side and provided between said panel main body and said reinforcement member. This plastic film reduces or even may prevent the local adherence of the plastic part to the reinforcement member and/or the panel, thus locally decoupling the plastic part from its adjacent parts, whereby the effect of shrinking plastic material is not transferred to said adjacent part. This effect will reduce the influence of shrinkage on the geometry of the panel.

It is advantageous that during the molding process the plastic film will stay in its applied position, and to achieve this, the adherence of its adhesive coating to the reinforcement member and/or to the panel main body shall last at least until the plastic part has been cured, during the molding process.

In order to ensure that the plastic part encounters the effect of the reduced adherence to its adjacent part(s), (e.g. the reinforcement member and/or the panel main body) in the area of the applied plastic film, the adherence between said plastic part and said adjacent part is stronger, compared to the adherence between said plastic film and said reinforcement member and/or said panel main body.

The plastic film applied to the reinforcement member and/or the panel may be of rectangular shape, but may also be of a non-rectangular shape if the shape of the reinforcement or the effect of the shrinkage so requires.

In the process of applying the plastic film to the reinforcement member and/or the panel, prior to the molding process, it is preferable that the adhesive coating of the plastic film is protected by a removable backing layer, until the moment the plastic film is applied to the reinforcement member and/or the panel main body.

In a process, a panel main body and at least one reinforcement member are provided. The plastic film or other provision is applied to the panel main body and/or the reinforcement member, in such position where the at least reduced adherence of the plastic part towards its adjacent parts is required after the molding process. The panel main body and the reinforcement member are positioned in a molding tool, in such a way that the reinforcement member is preferably in the vicinity of one of the edges of the panel, and whereby the actual molding process starts with closing the molding tool and sequentially applying fluid plastic material into the molding tool, to mold a plastic part to the reinforcement member, and/or the panel main body, and the side of the plastic film or other provision facing away from its side which is applied to the panel main body or reinforcement member.

It is very desirable that the adherence of the plastic film to the reinforcement member and/or the panel main body is optimized, because when small openings occur between film and reinforcement member and/or panel main body, caused by air or dirt particles entrapped, prior to the molding process, fluid plastic material may flow into these openings and may increase the adherence of plastic material where this is required to be at least reduced. To reduce such incident, the adhesive coating of the plastic film is covered by a removable backing layer, and the surfaces of the reinforcement member and/or the panel main body are treated with a decreasing solvent. Just prior to the application of the plastic film to said adjacent parts, the backing layer of the plastic film is removed, and the plastic film is applied to the reinforcement member and/or the panel main body.

In addition to this it may be advantageous to apply the plastic film to the reinforcement member and/or the panel main body by means of a pressure tool.

The advantageous effects of the plastic film locally reducing adherence between plastic part and reinforcement member and/or panel main body, are not only limited to the reduction of rejected parts in manufacturing parts, nor to the reduction of damages of parts in the vehicles, but also enables the manufacturer to easily apply this solution for shrinkage problems with every new development of panels without large investments to molding tooling or to equipment for applying the plastic film. It forms a flexible, and efficient solution for every shrinkage problem relating to molded panels for vehicles.

BRIEF DESCRIPTION OF THE DRAWINGS

Hereinafter aspects of the invention will be elucidated while referring to the schematic drawing in which:

FIG. 2 is a bottom view of a panel main body.

FIGS. 3 and 4 are enlarged sectional views along the line III-III and IV-IV, respectively, in FIG. 2, wherein FIG. 3 is another embodiment of FIG. 4.

DETAILED DESCRIPTION OF THE ILLUSTRATIVE EMBODIMENTS

Figure 1:
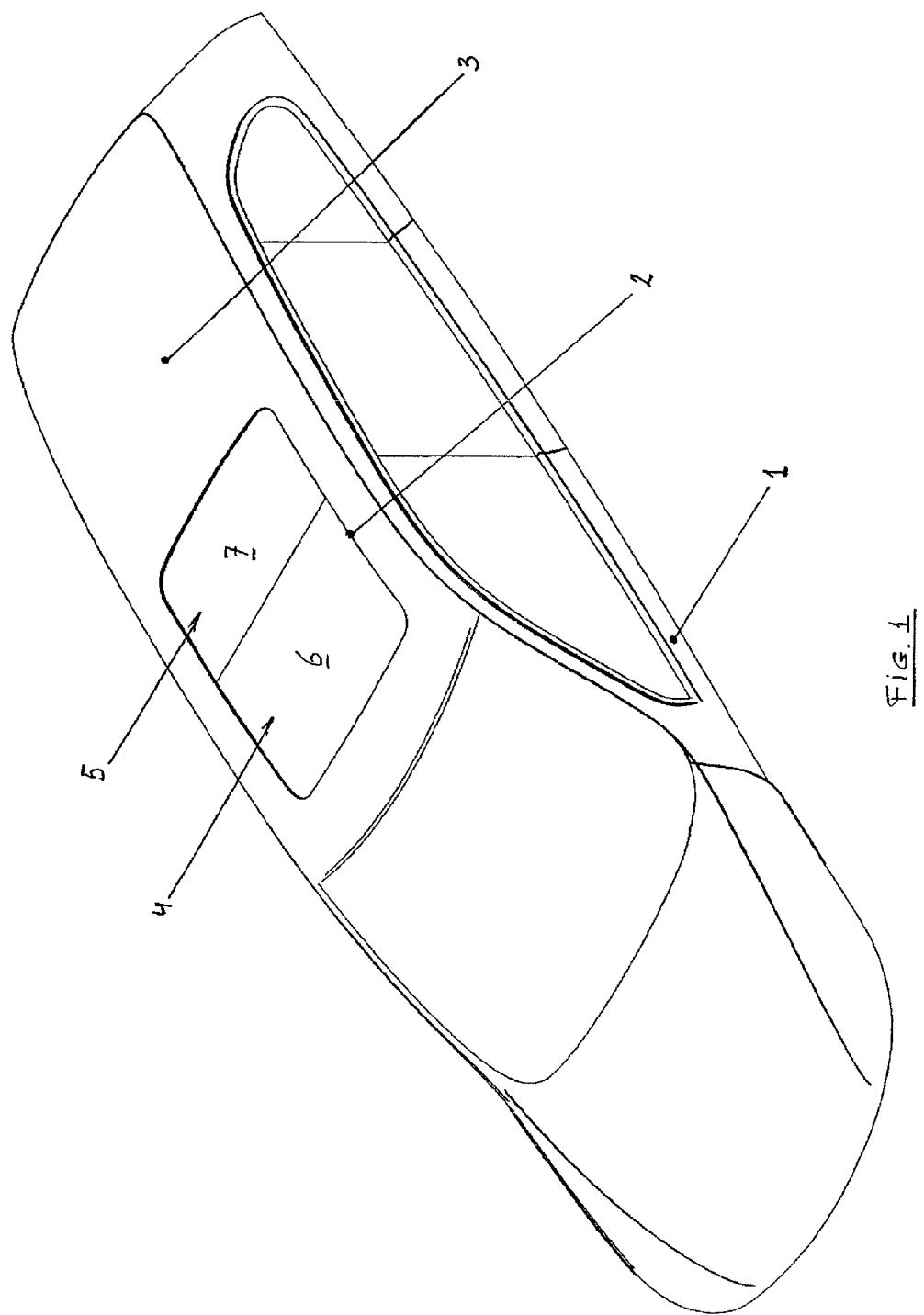
FIG. 1 is a perspective view of a vehicle shown only above its waist line, in which an open roof construction is fitted.

FIG. 1 shows an embodiment of an open roof construction for a vehicle 1, comprising a roof opening 2, provided in a fixed roof part 3 of the vehicle. A front panel assembly 4, and a rear panel assembly 5 of the open roof construction are capable of closing and at least partially opening said roof opening 2. The front panel assembly 4 is movable along longitudinal guides at opposites sides of the roof opening 2 (not shown, but known per se). The rear panel assembly 5, with its rear end, is movable only in vertical direction, thereby releasing an opening at the most rear side of the open roof construction. Both panel assemblies 4, 5 may be moved manually or by driving devices not illustrated but known per se. The cooperation between both panel assemblies 4, 5 and the longitudinal guides may occur in any known matter, and is not illustrated in detail. Aspects of the invention can be used for all types of open roof constructions comprising one or more panels, in particular glass panels, but also panels made of other materials, such as plastic.

As illustrated in FIG. 1, the front panel assembly 4 and the rear panel assembly 5 are adjacent to each other when closed and together can fully close or at least partially open the roof opening.

In FIG. 2, the front panel assembly 4 is shown by means of a bottom view. The front panel assembly 4 comprises a panel main body 6 (while the rear panel assembly 5 comprises a panel main body 7, see FIG. 1) and at least one reinforcement member 8, 9, 10, 11 positioned in the vicinity of one of the edges of the panel main body. The shape and position of a plastic film 14, 15 is shown by means of a hatched area in each of said reinforcement members 8, 9, 10, 11.

Figure 5:
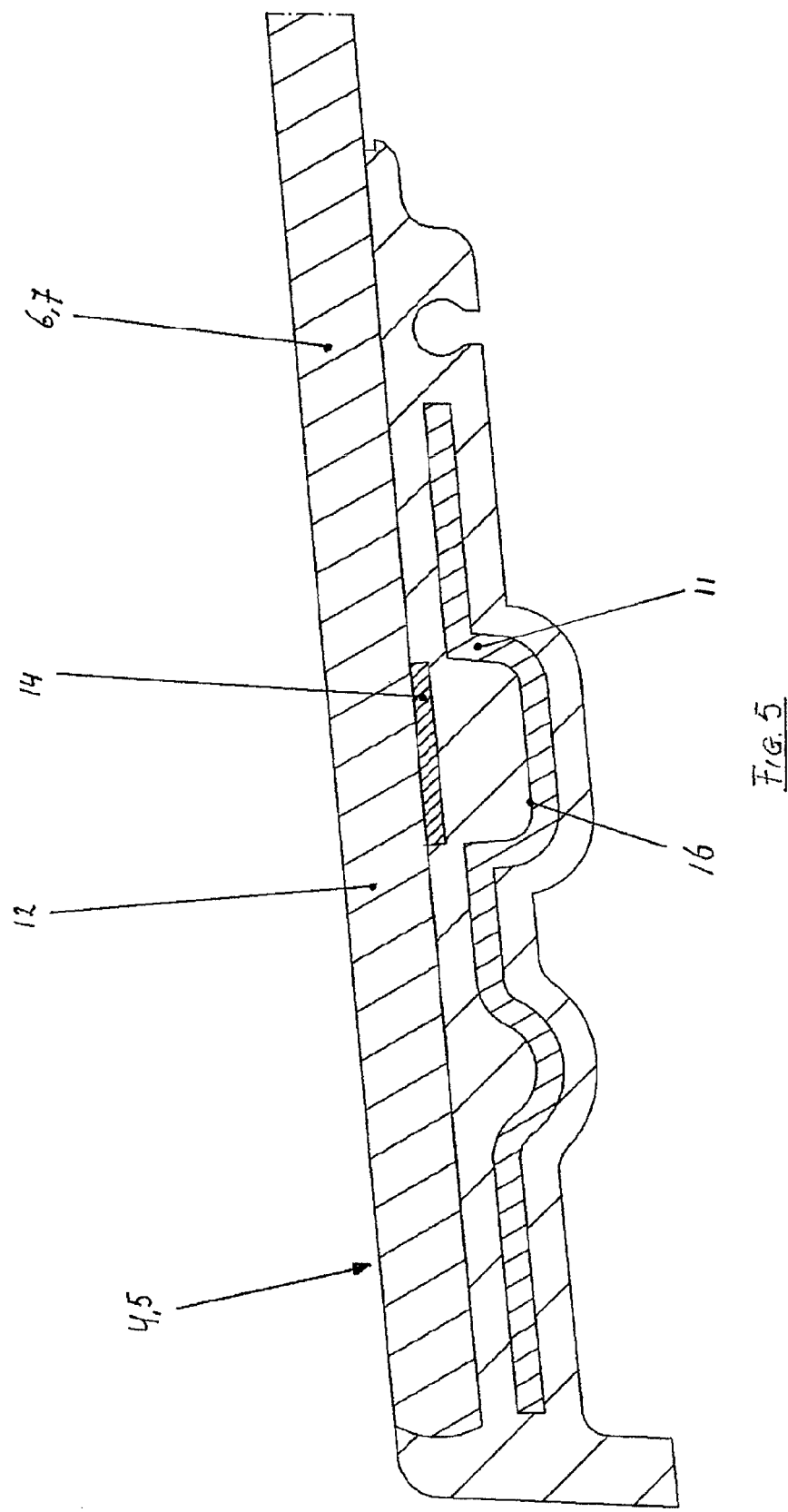
FIG. 5 is an enlarged sectional view along the line V-V in FIG. 2 and belonging to the embodiment of FIG. 4.

In FIGS. 3, 4 and 5 it is shown that the reinforcement member 8, 9, 10, 11 is firmly connected to the panel main body 6, 7 by means of a moldable part 12 such as a plastic part formed in a molding process from fluid material. The plastic part 12 is formed of a material suitable for a low pressure molding process such as Polyurethane or PVC. The reinforcement members 10, 11 comprise brackets 13 (see FIG. 2) used to connect the panel with the means for driving and/or guiding the panel in relation to the fixed roof 3. From FIGS. 3, 4, 5 it can be derived that the reinforcement members 8, 9, 10, 11 are used to add stiffness to the panel. The reinforcement members 8, 9, 10, 11 each have a depression 16 running lengthwise from one end of its body to its opposite end, to improve its intrinsic stiffness (also other curves can be used to increase the stiffness). The plastic film 14, 15 is positioned either opposite to the depression 16 (or hollow formed e.g. by folding the sides of the metal plate or formed by extruding the reinforcement from metal) on the adjacent surface of the panel main body (FIG. 3), and/or next to the bottom of the depression 16 on the inner surface of the reinforcement member 8, 9, 10, 11 (FIGS. 4 and 5). In FIGS. 3-5 it is shown the film 14, 15 can be applied either to the reinforcement or to the panel main body, but it would also be possible to apply the film 14, 15 to the panel main body in one spot and to the reinforcement member 8-11 in another spot.

The product shown in FIG. 2 is manufactured in a molding process that includes the following individual steps. First the panel main body 6, 7 and the reinforcement members 8, 9, 10, 11 are prepared by a treatment with a surface tension decreasing solvent. The backing layer of the plastic film is removed and the plastic film 14, 15 is applied to the panel main body and/or to the inner portion of the depression 16 in the reinforcement member 8, 9, 10, 11. This may be done by hand or by using an applying tool ensuring a good adherence of the plastic film.

The panel main body 6, 7 and the at least one reinforcement member 8, 9, 10, 11 with the plastic film 14, 15 applied are positioned in the molding tool. The tool upper and lower parts close, and fluid plastic material is injected into the tool, and is flowing into the cavity. After the injection stops a short curing period is taken, in which the tool is still closed, and the fluid material cools off to a solid state, in order to become plastic part 12. This plastic part 12 covers the plastic film completely and is firmly connected to the panel main body and/or reinforcement member at positions where the plastic film is not present. To finish the method, the molding tool is opened and the assembled panel is removed from the tool.

In this embodiment, the plastic film is within the plastic material so that the surface of the panel main body 6, 7 and/or reinforcement member 8-11 besides the plastic film 14, 15 is always covered by the plastic material or plastic part 12. This means that the film 14, 15 is surrounded completely by the plastic material 12 except where it is in contact with the panel main body 6, 7 or the reinforcement member 8-11. In other words, the plastic film 14, 15 or the area weakened by the plastic film or other provision is always, so in substantially all positions at a distance from the edges of the plastic part 12, as seen in a direction parallel to the adjacent panel main body surface.

From the above, it follows that aspects of the invention provides a panel and a method of molding a panel that leads to a high quality panel reducing the number of rejections during quality control and reducing any problems with damage during use as a result of the shrinkage forces in the plastic part.

The invention is not limited to the embodiments described above and shown in the drawings, which can be varied in different manners within the scope of the invention. For example, it would be possible to apply, e.g. spray by means of a template or the like, an adherence reducing agent on particular spots on the reinforcement member and/or panel main body. The reinforcement member(s) may also be positioned in other places on the panel main body, for example near the center thereof, if guide rails for guiding the panels are positioned near the longitudinal center of the vehicle.

What is claimed is:

1. A panel assembly for use in an open roof construction for a vehicle, comprising:
   a panel main body, and at least one reinforcement member positioned on said panel main body, and firmly connected thereto by means of a plastic part molded out of plastic material in a molding process to said panel main body and said reinforcement member; and
   a provision configured to at least locally reduce adherence of the plastic material to said reinforcement member and/or said panel main body during molding, wherein the provision is provided next to a surface of the panel main body or the reinforcement member, and wherein the provision is surrounded completely along lateral peripheries by the plastic material except where it is applied to said surface of the panel main body or the reinforcement member.

2. The panel assembly of claim 1, wherein said provision is a plastic film coated with an adhesive on one side and provided at a position between said panel main body and said reinforcement member.

3. The panel assembly of claim 2, wherein said plastic film adheres to said reinforcement member and/or said panel main body, at least during molding.

4. The panel assembly of claim 3, wherein the adherence between said reinforcement member and/or said panel main body and the plastic part is stronger than the adherence between said reinforcement member and/or said panel main body and said plastic film after molding.

5. The panel assembly of claim 2, wherein the plastic film has a non rectangular shape.

6. The panel assembly of claim 2, wherein the plastic film is completely covered by the plastic material.

7. A method of manufacturing a panel assembly for use in an open roof construction for a vehicle, comprising:
   providing a panel main body, wherein the panel main body is substantially rectangular,
   applying a provision to a surface of at least one of a reinforcement member or the panel main body,
   positioning the main body and the reinforcement member in a molding tool to thereby undergo a molding process, and
   applying a fluid moldable material into the molding tool to mold a plastic part to said panel main body and said reinforcement member to firmly connect said panel main body and said reinforcement member together, and such that the fluid moldable material covers the provision which thereby locally at least reduces adherence between the plastic part and the adjacent surface of the at least one reinforcement member and/or the panel main body, and wherein the provision is surrounded by the plastic part except where the plastic part is applied to the surface of the panel main body or the reinforcement member.

8. The method of claim 7, wherein the provision is a film.

9. The method of claim 7, comprising preparing the surfaces of the at least one reinforcement member and/or panel main body by applying a decreasing solvent.

10. The method of claim 7, wherein the provision comprises a plastic film and applying the provision comprises applying the plastic film to said at least one reinforcement member and/or said panel main body by a tool that exerts pressure.

11. The method of claim 10, and further comprising removing a backing layer from an adhesive side of the plastic film before it is applied to the at least one reinforcement member and/or panel main body.

12. The panel assembly according to claim 1, wherein the panel assembly is configured to close a roof opening in a vehicle fixed roof.

13. A panel assembly for use in a open roof construction for a vehicle comprising:
   a panel main body;
   at least one elongated reinforcement member;
   at least one elongated provision disposed separately on the panel main body and/or the reinforcement member, each provision having a surface between associated elongated side edges; and
   a plastic part connecting the reinforcement member to the panel main body, wherein the plastic part is joined to the panel main body and/or the reinforcement member along each side edge of each elongated provision, the plastic part further being disposed between the surface of each provision and a surface of the panel main body or a surface of the reinforcement member facing the surface of said each provision, and wherein adherence of the plastic part to the panel main body or the reinforcement member along each side of each provision is stronger than adherence of each provision to the panel main body or the reinforcement member.

14. The panel assembly of claim 13, wherein two separate provisions are provided.

15. The panel assembly of claim 13, wherein each of said at least one elongated provision is a plastic film coated with an adhesive on a side to which the provision is attached to the corresponding panel main body and/or said reinforcement member.

16. The panel assembly of claim 13, wherein at least one elongated provision is disposed on a flat surface of the panel main body and/or the reinforcement member.

17. The panel assembly of claim 13, wherein at least one elongated provision is rectangular.

18. A method of manufacturing a panel assembly for use in a open roof construction for a vehicle, comprising:
   applying an elongated provision to at least one reinforcement member and/or a panel main body, the elongated provision having a surface between elongated side edges, and
   molding material to said panel main body and said reinforcement member to connect said panel main body to said reinforcement member, wherein the molding material is joined to the panel main body and/or the reinforcement member along each side edge of the elongated provision, the molding material further being disposed between the surface of the provision and a surface of the panel main body or a surface of the reinforcement member facing the surface of the provision, and wherein adherence of the molding material to the panel main body or the reinforcement member along each side of each provision is stronger than adherence of the provision to the panel main body or the reinforcement member.

19. The panel assembly of claim 13, wherein at least one elongated provision is non-rectangular.

* * * * *